United States Patent
Herrod

(10) Patent No.: US 8,169,934 B2
(45) Date of Patent: May 1, 2012

(54) SYSTEM AND METHOD FOR PEER-TO-PEER STAGING OF A MOBILE DEVICE

(75) Inventor: Allan Herrod, Mission Viejo, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 468 days.

(21) Appl. No.: 12/403,101

(22) Filed: Mar. 12, 2009

(65) Prior Publication Data

US 2010/0234050 A1    Sep. 16, 2010

(51) Int. Cl.
- H04L 12/28 (2006.01)
- H04W 4/00 (2009.01)
- H04B 1/00 (2006.01)
- H04B 7/00 (2006.01)

(52) U.S. Cl. ........... 370/254; 370/338; 455/68; 455/466

(58) Field of Classification Search .................. 370/254, 370/338; 455/466, 68
See application file for complete search history.

(56) References Cited

U.S. PATENT DOCUMENTS

| | | | |
|---|---|---|---|
| 7,306,153 B2 | 12/2007 | Chong et al. | |
| 7,711,475 B1 * | 5/2010 | Cona et al. | 701/202 |
| 2002/0013143 A1 * | 1/2002 | Lee et al. | 455/412 |
| 2004/0133689 A1 * | 7/2004 | Vasisht | 709/228 |
| 2006/0000910 A1 | 1/2006 | Chong et al. | |
| 2007/0027964 A1 * | 2/2007 | Herrod et al. | 709/220 |
| 2007/0190939 A1 | 8/2007 | Abel | |
| 2008/0130844 A1 * | 6/2008 | Hubbard et al. | 379/93.02 |
| 2008/0232272 A1 * | 9/2008 | Gelbman et al. | 370/254 |
| 2009/0100166 A1 * | 4/2009 | DeAnna et al. | 709/223 |
| 2010/0190490 A1 * | 7/2010 | Karancheti et al. | 455/426.1 |
| 2010/0262651 A1 * | 10/2010 | Nguyen et al. | 709/203 |
| 2011/0131273 A1 * | 6/2011 | Merissert-Coffini res et al. | 709/203 |

FOREIGN PATENT DOCUMENTS

EP    1793531    6/2007

OTHER PUBLICATIONS

International Search Report and Written Opinion dated Oct. 27, 2010 in related case PCT/US2010/024984.

* cited by examiner

*Primary Examiner* — Chi Pham
*Assistant Examiner* — Farah Faroul

(57) ABSTRACT

A system comprising a first mobile device and a second mobile device. The first mobile device includes a memory and an output arrangement. The memory stores a staging profile. The staging profile is used to configure at least a portion of the first mobile device. The second mobile device includes an input arrangement. The input arrangement obtains the staging profile from the output arrangement. At least a portion of the second mobile device is configured using the staging profile.

17 Claims, 2 Drawing Sheets

SYSTEM AND METHOD FOR PEER-TO-PEER STAGING OF A MOBILE DEVICE

BACKGROUND

Mobile computing devices may use staging profiles to provide them with a minimum amount of information required to join a staging network or connect to a staging server. Typically, this may be accomplished by connecting a device to a network connection that does not require pre-configuration, such as a cradle or an open network, or by scanning a bar code containing the staging profile. However, these methods may require the device to be brought to a specific location where they may be accomplished.

SUMMARY OF THE INVENTION

The present invention is directed to a system comprising a first mobile device and a second mobile device. The first mobile device includes a memory and an output arrangement. The memory stores a staging profile. The staging profile is used to configure at least a portion of the first mobile device. The second mobile device includes an input arrangement. The input arrangement obtains the staging profile from the output arrangement. At least a portion of the second mobile device is configured using the staging profile.

The present invention is further directed to a method comprising receiving, by a first mobile device, a staging profile; storing the staging profile in a memory of the first mobile device; and transmitting, by the first mobile device, the staging profile using an output arrangement of the first mobile device.

The present invention is further directed to a mobile computing device comprising a memory and an output arrangement. The memory stores a staging profile. The staging profile is used to configure at least a portion of the device. The output arrangement provides the staging profile to a further mobile computing device.

DETAILED DESCRIPTION

Figure 1:
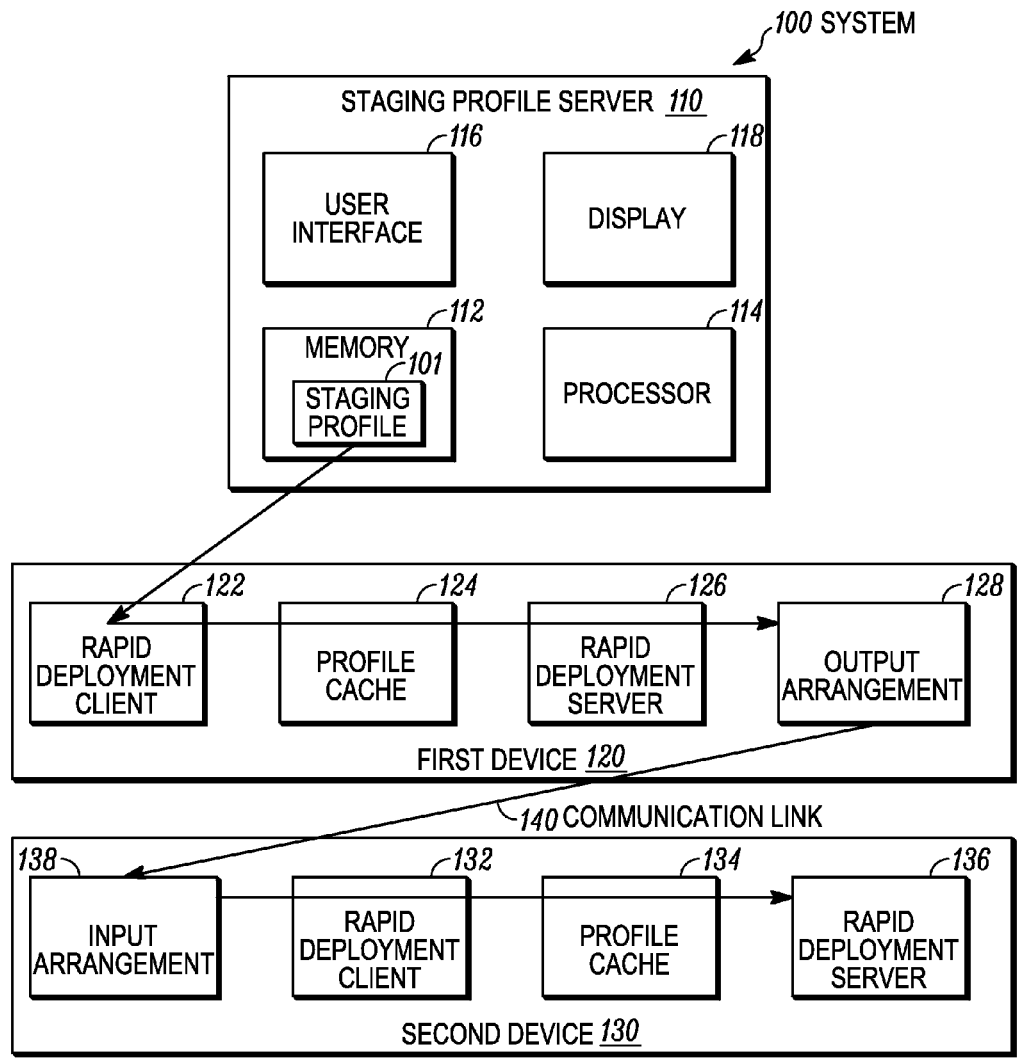
FIG. 1 shows an exemplary system implementing peer-to-peer staging of a mobile device according to the present invention.

The exemplary embodiments of the present invention may be further understood with reference to the following description and the appended drawings, wherein like elements are referred to with the same reference numerals. The exemplary embodiments describe systems and methods for implementing peer-to-peer sharing of staging profiles among mobile computing devices. In the exemplary embodiments, a mobile device may store one or more staging profiles that it has previously used to self-configure and provide such profiles to other devices that may subsequently use them for further configuration processes.

Typically, mobile computing devices that connect to networks may require various configuration information in order to properly establish such connections. Some or even most of the configuration information may be retrieved upon an initial connection with such a network, but the device may first require a small amount of information in order to establish such an initial connection. This information may be provided by a staging profile, which may generally provide a device with the minimum information required to connect to a staging network, connect to a staging server, and retrieve information from the staging server. More specifically, this may include network settings required to access a network, the location of the server to be accessed, and the identification of one or more software programs to be retrieved from the server once it has been accessed. Staging information may be initially be provided to a mobile device by establishing a network connection that does not require pre-configuration, such as connecting to an open network or with a cradle, by scanning a bar code, or receiving an SMS message or audio signal into which the staging information is encoded, but these may require the device to in a specific location where it is possible to retrieve such information.

FIG. 1 shows an exemplary embodiment of a system 100 according to the present invention. The system 100 may include a staging profile server 110. The staging profile server stores a staging profile 101; the exemplary embodiments describe only a single staging profile 101, but those of skill in the art will understand that multiple such profiles may be stored and served by the staging profile server 110. The staging profile 101 may be stored by the staging profile server 110 in a memory 112, such as a hard drive. The staging profile server 110 may be dedicated to the task of serving staging profiles as described herein or may also be used for other tasks. The staging profile server 110 may also include a processor 114, a user interface 116, and a display 118. The user interface 11G may be used by a user to modify the staging profile 101 or other staging profiles, select the staging profile 101 from among other staging profiles that may be stored in the memory 112, or accomplish various other tasks the user may undertake.

The system 100 may further include two or more mobile devices, a first mobile device 120 and a second mobile device 130 (referred to hereinafter as "first device 120" and "second device 130" or, collectively, "the devices 120 and 130"). The first device 120 and the second device 130 may be the same model of mobile devices or may differ from one another; the designations "first" and "second" refer to the functions of the devices 120 and 130 in the exemplary method which will be described herein, rather than to any inherent distinguishing features of the devices 120 and 130 themselves. However, in scenarios wherein the devices 120 and 130 are being configured with the same staging profile, they may typically be of similar hardware configurations. The devices 120 and 130 may include, for example, bar code scanners, imaging scanners, palmtop computers, mobile telephones, and/or any other device which may be configured by use of a staging profile. The devices 120 and 130 may communicate with one another by a communication link 140 using peer-to-peer communication methods of any variety that may accomplish the transmission of the staging profile 101 as described herein. This may include a wired network connection (e.g., using a USB cable, etc.), a wireless network connection (e.g., WiFi, etc.), infrared beaming, wireless personal area networking connections such as Bluetooth, audio modulation, optical scanning, SMS messages, etc. It should be noted that while FIG. 1 illustrates staging profile 101 within memory 112, the staging profile 101 may be sent to the devices 120 and 130 as described below; the exemplary path taken by the staging profile 101 in the course of the execution of the exemplary method 200 is indicated by arrows in FIG. 1.

The devices 120 and 130 may each include a rapid deployment ("RD") client 122 and 132, respectively. The RD clients 122 and 132 may receive staging profiles such as the staging profile 101 and apply them to the devices 120 and 130, as is known in the art. The devices 120 and 130 may also each include a profile cache 124 and 134, respectively. The caches 124 and 134 may be dedicated memory for the purpose of archiving one or more staging profiles, or alternately may be a segment of a larger memory (e.g., a hard drive, flash memory, etc.) used to accomplish this task. The caches 124 and 134 may store the most recent staging profile that has been applied to the devices 120 and 130, respectively, a number (e.g., a predefined number or a user-configurable number) of the most recent staging profiles, or previously-applied staging profiles of a given name or type. Alternately, because staging profiles are typically small, the caches 124 and 134 may store all staging profiles that have been previously applied to their corresponding devices 120 and 130 respectively.

The devices 120 and 130 may also each include RD servers 126 and 136, respectively. The RD servers 126 and 136 may enable the corresponding device to serve a staging profile stored in the corresponding profile cache to a receiving device, via an RD client of the receiving device. For example, the RD server 126 may transmit the staging profile 101, previously received by the RD client 122, used to configure the first device 120 and stored in the profile cache 124, to the device 130. The device 130 may then use the RD client 132 to receive the staging profile 101, configure itself accordingly, and store the staging profile 101 in its own profile cache 136. Those of skill in the art will understand that the RD clients 122 and 132 and the RD servers 126 and 136 may typically be software applications that reside in a memory of the devices 120 and 130 (e.g., a memory that also stores the caches 124 and 134) and are executed by processors (not shown).

The device 120 may include an output arrangement 128; the device 130 may include an input arrangement 138. The communications link 140, described above, may represent a connection between the output arrangement 128 and the input arrangement 138. The output arrangement 128 and the input arrangement 138 may take a variety of different forms depending on the nature of the communications link. In some embodiments, the output arrangement 128 and input arrangement 138 may be substantially identical components; in such embodiments, the designations "output" and "input" may simply refer to their functions in the transmission of the staging profile 101. For example, the output arrangement 128 and the input arrangement may both be USB ports connected by a USB cable, infrared communications ports, Bluetooth transceivers, WiFi transceivers or cellular transceivers. In other embodiments, the output arrangement 128 and input arrangement 138 may differ from one another and be paired appropriately for the nature of the communications link 140. For example, the output arrangement 128 may be a speaker broadcasting information encoded in an audio signal into which the staging profile 101 may be encoded, while the input arrangement 138 may be a microphone receiving such an audio signal; the output arrangement 128 may be the display showing a bar code into which the staging profile 101 may be encoded, while the input arrangement may be a scanner receiving and decoding such a bar code.

Those of skill in the art will further understand that the devices 120 and 130 may include various other components (e.g., user interfaces, displays, communication ports, internal or external storage, optical scanners or imagers, etc.), but that these are omitted from the figures and from this disclosure for brevity. Further, while the second device 130 of the exemplary embodiment described herein includes the profile cache 134 and the RD server 136, in other embodiments the second device 130 may lack these elements.

Figure 2:
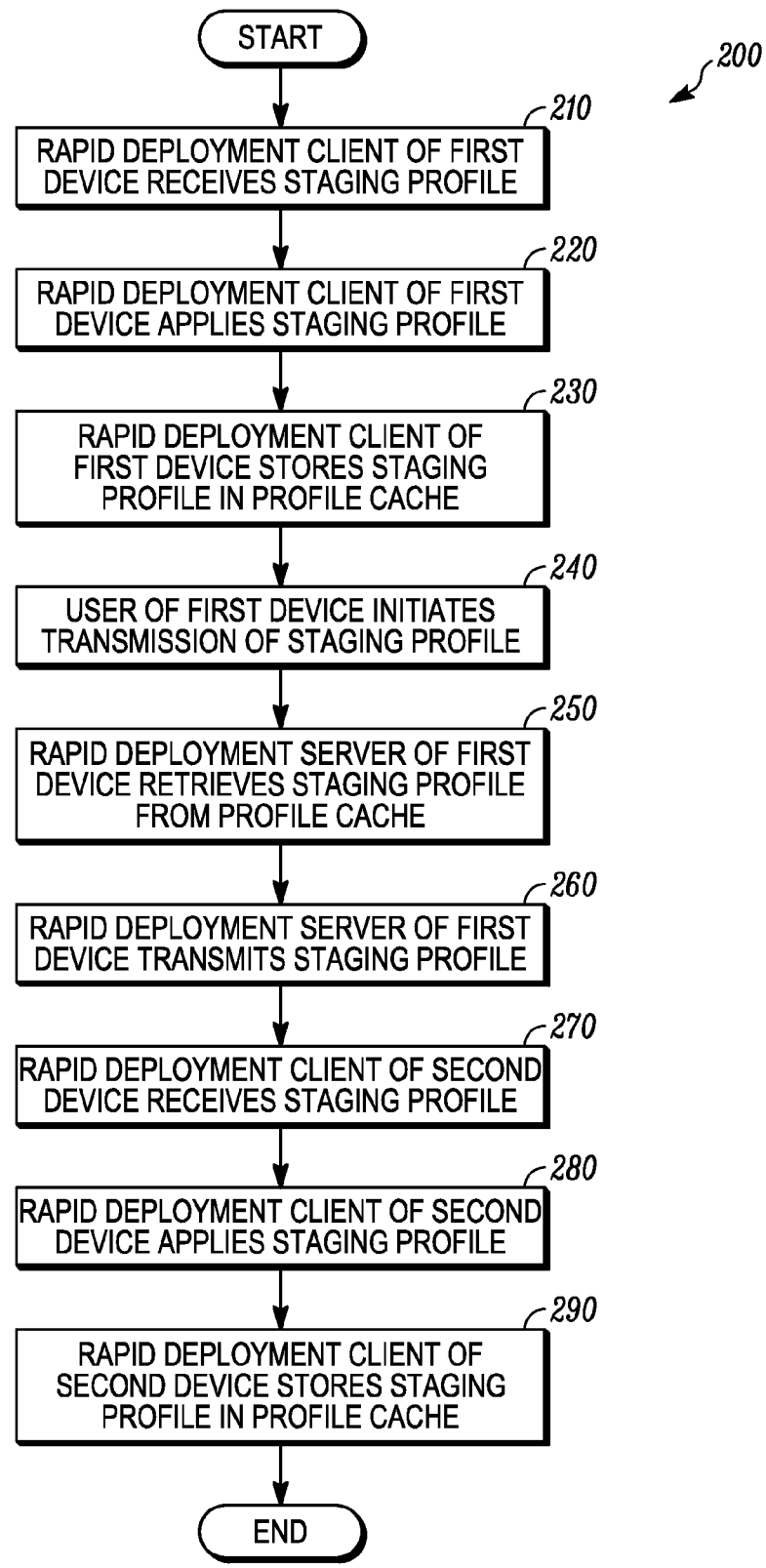
FIG. 2 shows an exemplary method for implementing peer-to-peer staging of a mobile device according to the present invention.

FIG. 2 illustrates an exemplary method 200 for peer-to-peer sharing of staging profiles according to the present invention. The exemplary method 200 will be described herein with reference to the elements of the exemplary system 100 described above and shown in FIG. 1. In step 210, the RD client 122 of the first device 120 receives the staging profile 101 from the staging profile server 110. This may be accomplished via direct communication, indirect communication over a network, or any other suitable method of data transmission. In some exemplary embodiments, this may involve communication via an open wireless network, connecting to a docking cradle or other wired network connection, receiving an SMS message, scanning a bar code into which the staging profile 101 is encoded, receiving an audio signal into which the staging profile 101 is encoded, or another type of connection that does not require pre-configuration of the first device 120.

In step 220, the RD client 122 applies the staging profile 101 to configure the first device 120. As described above, this may generally involve providing the first device 120 with a minimum amount of information required to join to a staging network, connect to a staging server, and retrieve necessary software therefrom. In other embodiments, the first device 120 may not be configured with the staging profile, 101, but, rather, may simply receive it for the purpose of later sharing it with other devices. Steps 210 and 220 generally outline the use of staging profiles as presently known in the art.

In step 230, the RD client 122 stores the staging profile 101 into the profile cache 124. As described above, the profile cache 124 may store all staging profiles applied to the first device 120, or may store a subset of past staging profiles, such as a number of most recent staging profiles or past staging profiles of a given type; thus, the staging profile 101 may either be simply added to the profile cache 124 or may replace a previously-stored staging profile therein, as appropriate for the configuration of the profile cache 124.

In step 240, a user of the first device 120 requests the transmission of the staging profile 101 (e.g., by entering a command to do so into the RD server 126, executing on the first device 120). Upon receiving this request, in step 250 the RD server 126 retrieves the staging profile 101 from the profile cache 124. The staging profile 101 may be the only staging profile stored by the profile cache 124, or in other embodiments may be selected by the user from a plurality of staging profiles stored in the profile cache 124 as, for example, the most appropriate for the second device 130 or the most recently used by the first device 120.

After retrieving the staging profile 101, in step 260 the RD server 126 transmits the staging profile 101. This may be accomplished using the output arrangement 128. For example, in an embodiment where the output arrangement 128 is a display, the staging profile 101 may be encoded in a barcode displayed on the display of the first device 120; in an embodiment where the output arrangement 128 is an audio transmitter, the staging profile 101 may be encoded in an audio signal. In some embodiments, the staging profile 101 may be broadcasted by the first device 120 openly to any devices that are present and able to receive it; in other embodiments, the staging profile 101 may be transmitted specifically to the second device 130.

In step 270, the second device 130 receives the staging profile 101 using the input arrangement 138. Similar to step 260, the specific manner in which this is accomplished may vary based on the nature of the output arrangement 128 and the input arrangement 138. Subsequently, in step 280, the RD client 132 applies the staging profile 101 to the device 130. As in step 220, this may follow standard procedures for applying staging profiles as are known in the art.

In step 290, the RD client 132 stores the staging profile 101 in the profile cache 134 for future use by the device 130 or for future retrieval by the RD server 136. After step 290, the method 200 terminates. However, as stated above, in other exemplary embodiments of the system 100, the second device 130 may lack the profile cache 134 and RD server 136; in such embodiments, an appropriate exemplary method may terminate after step 280. Those of skill in the art will understand that the exemplary first device 120 may subsequently provide the staging profile 101 to other recipient mobile devices, which may, in effect, act as further embodiments of the second device 130. In such situations, steps 240 to 290 of the method 200 may be repeated as necessary. Further, those of skill in the art will understand that a second device 130 including a profile cache 124 and a RD server 136 may subsequently provide the staging profile 101 to other recipient mobile devices; in such embodiments, the second device 130 may act as the first device did in the method 200.

The above-described exemplary embodiments refer to an initial transfer of a staging profile 101 from a staging profile server 110 to a first device 120. However, those of skill in the art will understand that the first device 120 may obtain the staging profile 101 in other manners as described above. Further, those of skill in the art will understand that while the exemplary embodiments described above make specific reference to configuration using staging profiles, the same principles may apply equally to peer-to-peer delivery of various other types of configuration information.

Providing for the distribution of staging profiles in the exemplary manners described above may enable staging of mobile devices added to an existing system without bringing such devices to a central staging location, such as a docking cradle or staging server. Further, staging in this manner may enable more rapid staging of large numbers of devices during initial staging of a system comprising such devices; this may be accomplished, for example, by using one or more already-staged devices to increase the number of sources for such staging profiles available to subsequent devices.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A system, comprising:
    a first mobile device including a memory and an output arrangement, the memory storing a plurality of staging profiles, the plurality including a staging profile used to configure at least a portion of the first mobile device and another staging profile not previously used to configure a portion of the first mobile device; and
    a second mobile device including an input arrangement, the input arrangement obtaining at least one of the plurality of staging profiles from the output arrangement of the first mobile device, wherein at least a portion of the second mobile device is configured using the staging profile.

2. The system of claim 1, wherein the second mobile device further includes a second memory, the second memory storing the at least one of the plurality of staging profiles.

3. The system of claim 1, wherein the output arrangement is one of an infrared beam, a Bluetooth transceiver, an audio speaker, an optical display, a Universal Serial Bus (USB) interface, a WiFi transceiver and a Short Message Service (SMS) message.

4. The system of claim 1, wherein the plurality of staging profiles includes all staging profiles that have been previously used to configure at least a portion of the first mobile device.

5. The system of claim 1, wherein the plurality of staging profiles includes a predetermined number of staging profiles.

6. The system of claim 1, wherein the first mobile device receives the plurality of staging profiles by one of connecting to a wired network, connecting to an open wireless network, connecting to a predefined peer-to-peer wireless network, scanning an optically readable data storage medium, receiving a Short Message Service (SMS) message and receiving an audio signal.

7. The system of claim 1, wherein the staging profile contains information enabling the first mobile device to communicate with one of a staging network and a deployment server.

8. The system of claim 1, wherein the staging profile contains one of a configuration setting and an identification of a software program to be retrieved from a deployment server.

9. The system of claim 1, wherein the first mobile device and the second mobile device include similar hardware configurations.

10. A method, comprising:
    receiving, by a first mobile device, a plurality of staging profiles, the plurality including a staging profile used to configure at least a portion of the first mobile device and another staging profile not previously used to configure a portion of the first mobile device;
    storing the plurality of staging profiles in a memory of the first mobile device; and
    transmitting, by the first mobile device, at least one of the plurality of staging profiles using an output arrangement of the first mobile device.

11. The method of claim 10, further comprising:
    configuring at least a portion of the first mobile device using the staging profile.

12. The method of claim 10, further comprising:
    obtaining, by a second mobile device, the at least one of the plurality of staging profiles from the output arrangement of the first mobile device; and
    configuring at least a portion of the second mobile device using the at least one of the plurality of staging profiles.

13. The method of claim 12, further comprising:
    storing the at least one of the plurality of staging profiles in a memory of the second mobile device.

14. The method of claim 10, wherein the output arrangement of the first mobile device is one of an infrared beam, a Bluetooth transceiver, an audio speaker, an optical display, a Universal Serial Bus (USB) interface, a WiFi transceiver and a Short Message Service (SMS) message.

15. The method of claim 10, wherein the first mobile device receives the plurality of staging profiles by one of connecting to a wired network, connecting to an open wireless network, connecting to a predefined peer-to-peer wireless network, scanning an optically readable data storage medium, receiving a Short Message Service (SMS) message and receiving an audio signal.

16. The method of claim 10, wherein the first mobile device and the second mobile device include similar hardware configurations.

17. A mobile computing device, comprising:
    a memory storing a plurality of staging profiles, the plurality including a staging profile used to configure at least a portion of the device and another staging profile not previously used to configure a portion of the first mobile device; and
    an output arrangement providing at least one of the plurality of staging profiles to another mobile computing device.

* * * * *

UNITED STATES PATENT AND TRADEMARK OFFICE
CERTIFICATE OF CORRECTION

PATENT NO. : 8,169,934 B2
APPLICATION NO. : 12/403101
DATED : May 1, 2012
INVENTOR(S) : Herrod It is certified that error appears in the above-identified patent and that said Letters Patent is hereby corrected as shown below:

In Column 2, Line 26, delete "11G" and insert -- 116 --, therefor.

In Column 3, Line 38, delete "arrangement" and insert -- arrangement 138 --, therefor.

In Column 3, Line 49, delete "arrangement" and insert -- arrangement 138 --, therefor.

Signed and Sealed this
Second Day of April, 2013

Teresa Stanek Rea
*Acting Director of the United States Patent and Trademark Office*